March 10, 1942.  F. P. SHANNON  2,275,997
CONTROL FOR ABSORPTION REFRIGERATING SYSTEMS
Filed May 22, 1941  2 Sheets—Sheet 1

FRANCIS P. SHANNON
INVENTOR

BY Arthur J. Robert
ATTORNEY

March 10, 1942.　　F. P. SHANNON　　2,275,997
CONTROL FOR ABSORPTION REFRIGERATING SYSTEMS
Filed May 22, 1941　　2 Sheets-Sheet 2

FRANCIS P. SHANNON
INVENTOR

BY Arthur H. Robert
ATTORNEY

Patented Mar. 10, 1942

2,275,997

UNITED STATES PATENT OFFICE 2,275,997

CONTROL FOR ABSORPTION REFRIGERATING SYSTEMS

Francis P. Shannon, Louisville, Ky., assignor to Henry Vogt Machine Company, Louisville, Ky., a corporation of Kentucky Application May 22, 1941, Serial No. 394,680

4 Claims. (Cl. 62—5)

This invention relates to control systems for absorption refrigerating systems of the closed cycle type wherein weak liquor from a heat exchanger and gas from an evaporator are both fed to the absorber to form a strong liquor.

In absorption refrigerating systems of this type, the flow of weak liquor preferably should remain constant for any given load condition. Since it tends to vary, a flow control valve is usually interposed in the weak liquor line between the absorber and a flow indicator having a movable arm which indicates the rate of flow and which therefore always occupies one predetermined angular position for one given flow, and other predetermined angular positions for other given flows. The movement of the flow-indicating arm from a given flow position is used to initiate the correcting operation of the flow control valve through an intermediate control system.

In one control system wherein the flow control valve is held in different positions by different operating air pressures, an air-leakage relay, responsive to changes in the weak liquor flow, is used to change the operating air pressure in order to move the valve and thus restore the flow, while a reset mechanism, responsive to changes in the operating air pressure, is employed to reset the air-leakage relay so that, when the flow is restored, the relay will maintain the air pressure at the changed value. With a straight flow control of this character, it is necessary "manually" to adjust the connection between the reset mechanism and the air-leakage relay from one control point to another to accommodate changes in either the capacity of the system or in the operating ratio of the weak-liquor flow to the flow of gas to the absorber. In another control system of this same general type, the air-leakage relay is made responsive to changes in a predetermined ratio between the weak-liquor flow and the flow of gas to the absorber in order to change the operating air pressure and thus restore the ratio, the reset mechanism operating as before so that when the ratio is restored, the air-leakage relay will operate to maintain the air pressure at the changed value. While this arrangement automatically accommodates changes in capacity, it remains necessary "manually" to adjust it from one control point to another to accommodate necessary changes in ratio.

The principal object of the present invention is to provide an entirely automatic control system of this same general type wherein the connection between the reset mechanism and the air-leakage relay is changed automatically from one control point to another to accommodate changes in either the capacity or the operating ratio.

Another object is to provide in combination with a flow control an auxiliary control for automatically adjusting the connection between the reset mechanism and the air relay mechanism of the flow control as conditions require.

The invention is illustrated in the accompanying drawings, wherein.

Figure 1:
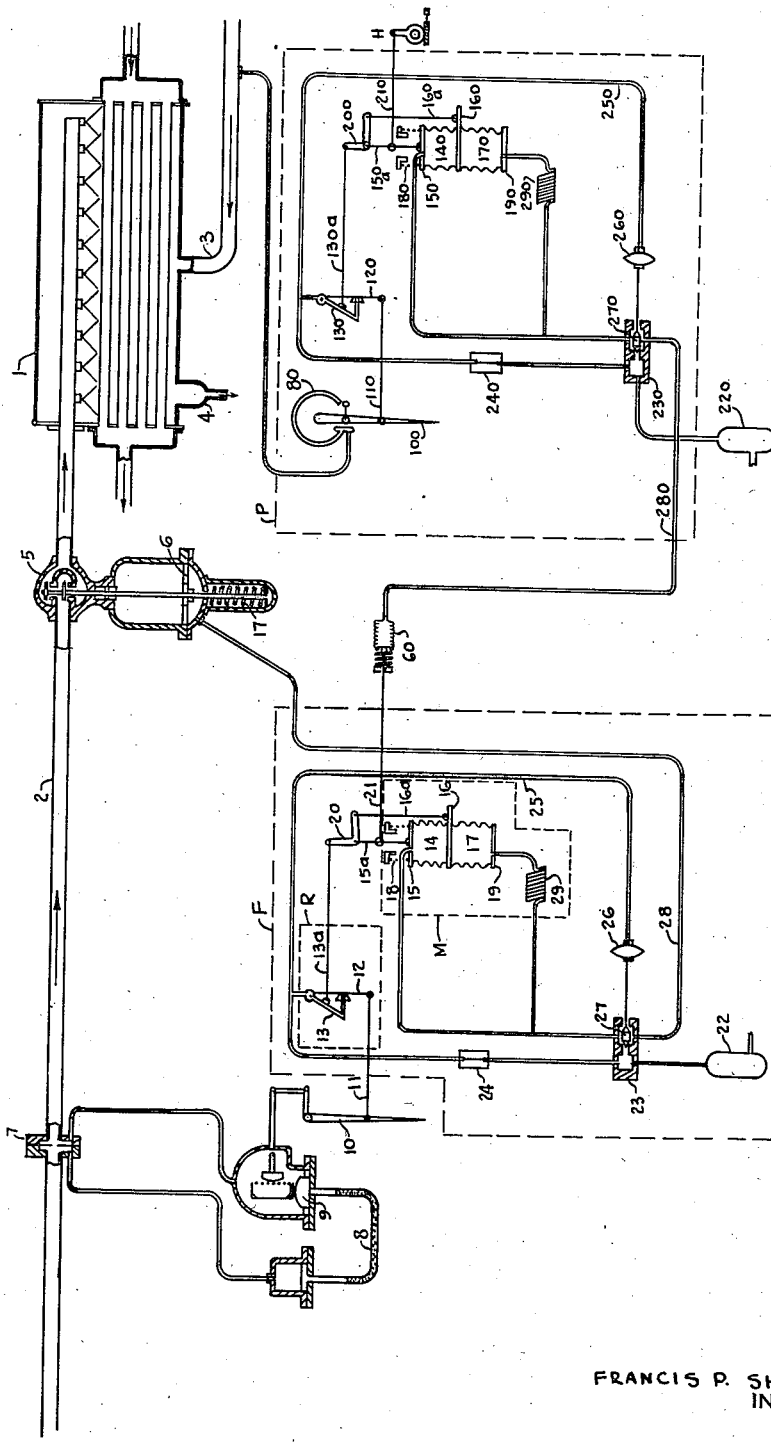
Figure 1 is a schematic view of one embodiment of my invention.

The drawings conventionally illustrate an absorber 1 arranged to receive weak liquor from a heat exchanger (not shown) through a weak-liquor line 2, and gas from an evaporator (not shown) through a gas line 3, the resulting strong liquor formed in the absorber discharging through a strong-liquor line 4 to a pump, not shown. A conventional fluid-operated, weak-liquor, flow-control valve 5, having a diaphragm 6 is interposed in the weak-liquor line between the absorber and a fixed metering orifice 7 forming a part of a conventional flow indicator.

The flow indicator registers the pressure drop across the metering orifice 7 by means of a mercury manometer 8 having on one side a float 9 which is connected, through appropriate linkage, to a flow indicating arm 10. With this arrangement, it will be evident that the indicating arm 10 will swing about its upper end pivot in response to variations in the flow of weak-liquor and that it will always occupy one predetermined angular position for one given flow and another predetermined angular position for another given flow. With the absorption system operating at a given capacity, the movement of the flow-indicating arm 10 from the given flow position for that capacity initiates the correcting operation of the weak-liquor valve 5 through an intermediate control mechanism F.

While any suitable control mechanism F may be employed, a mechanism of the type schematically illustrated is preferred. This particular type of mechanism is presently manufactured by the Foxboro Company of Foxboro, Massachusetts, and marketed as "Model 10 Stabilog with M/20 Stabilset Hydron."

The air relay R comprises a flapper 12 and a follower 13 both mounted for pivotal movement on the asme axis. The flow-indicating arm 10 is mechanically connected through link 11 to the flapper 12 to impart to the flapper whatever movement it undergoes. The flapper 12 thus initiates the operation of the control mechanism F in response to flow variations. The follower 13 is in the form of an air nozzle mounted adjacent the flapper 12 for pivotal movement through the same range of predetermined angular positions but normally is held in one predetermined angular position by the reset mechanism M to which it is mechanically connected.

The reset mechanism M comprises a fast-acting bellows 14 having its outer end closed by an end bar 15 and its inner end separated by a common equalizer bar 16 from a slow-acting bellows 17. These parts are interposed between an upper spring 18 and a lower fixed framework 19 with the outer end of the fast-acting bellows 14 operating against spring 18 and the corresponding end of the slow-acting bellows 17 secured to the fixed framework 19. The reset mechanism is mechanically connected to the follower 13 of the air relay R through a floating bell crank 20, this connection including: link 13a connecting the follower 13 to one end of the bell crank 20; link 15a connecting the end bar 15 to the floating pivot of the bell crank 20; and link 16a connecting the common bar 16 to the other end of the bell crank.

Air under pressure is supplied to the control system from some suitable source such as the supply tank 22. This tank is connected through the pressure chamber of a control head 23, capillary coil 24 and line 25 to both the nozzle 13 of relay R and a diaphragm 26, the latter being at the terminus of line 25. The diaphragm 26 is mechanically connected to a control valve 27 in the valve chamber of the control head 23. The valve chamber has open communication with the weak liquor valve 5 through a terminal pressure line 28. It also has open communication with the air lines leading to both bellows of the reset mechanism M but, in this connection, it will be noted that the line leading to the fast acting bellows 14 is unobstructed while the line leading to the slow-acting bellows 17 contains a capillary coil 29.

The valve chamber of the control head 23 is also connected, through one orifice, to receive air from the pressure chamber of the control head and, through another orifice, to discharge air to atmosphere, these orifices being controlled by the valve 27. In the central position of the valve 27, air enters the valve chamber from the pressure chamber and escapes from the valve chamber into outside atmosphere at rates which maintain what may be termed a medium operating air pressure in the terminal pressure line 28 and in the lines leading to the reset mechanism M. As the valve 27 moves progressively left-ward the operating air pressure is progressively reduced because the rate at which air enters the chamber is progressively reduced while the rate at which it escapes from the chamber is increased. On the other hand, as the valve 27 moves progressively rightward, the operating air pressure is progressively increased because rate at which air enters the chamber is increased while the rate at which it escapes from the chamber is reduced.

Figure 2:
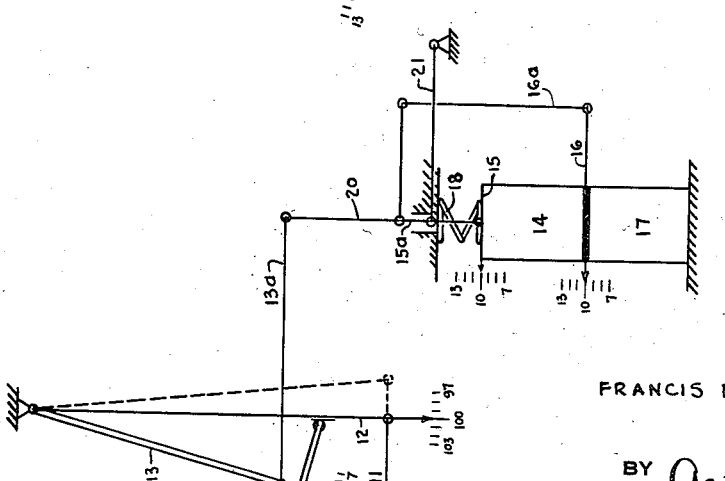

In describing the operation, it is assumed that a desired weak-liquor flow of 100 pounds per minute is established with the flapper 12 at the 100-pound position, the air nozzle 13, the end bar 15 and the common bar 16, all at positions #10 as indicated in Figure 2, and that valve 27 is centrally positioned. With this assumption, air from the supply tank enters the control-head-valve chamber and escapes therefrom at rates which result in the maintenance of a constant "medium" pressure in the terminal pressure line 28 and in both bellows of the reset mechanism M. At the same time, air flows through the capillary coil 24 and escapes from the nozzle 13 of the air relay R, at rates which result in the maintenance of a constant "medium" pressure in the diaphragm 26.

Figure 3:
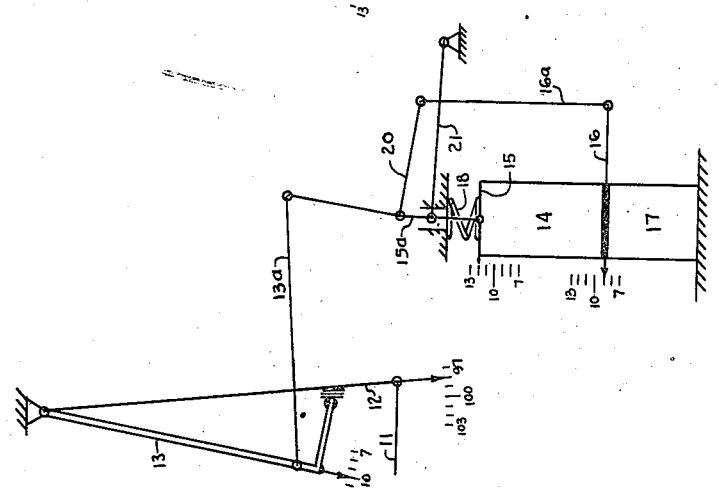

Now, if the weak-liquor flow drops from 100 pounds to, say 98, the flapper will swing counterclockwise to the 98-pound position as indicated in Figure 3. This increases the air leakage from relay R, and proportionately deflates diaphragm 26 which pulls valve 27 rightward. Such movement of valve 27 increases its air-entry port and decreases its air-escaping port, causing the operating air pressure to increase to a higher value. The increase in operating air pressure correspondingly opens the weak-liquor valve 5, permitting the weak-liquor flow to increase to 100 pounds. As a matter of fact, the increase in flow will usually go above 100 pounds but, for the sake of clarity in describing the operation of the control, a return to 100 pounds will be assumed. As the weak-liquor flow returns to 100, the flapper 12 returns from the 98-pound position to its original 100-pound position.

Since a larger opening of valve 5 is now required to maintain a 100-pound flow, a correspondingly larger operating air pressure must be maintained. To maintain a larger air pressure, the air leakage relay R must be reset to provide a larger rate of air leakage, one sufficient to hold diaphragm 26 under whatever smaller pressure is necessary to secure the higher operating air pressure. The reset mechanism M functions to reset the air leakage relay R to the new rate of air leakage.

Figure 2 schematically illustrates the relative positions of the various parts in the air-leakage relay R and the reset mechanism M before the flow deviation occurred. Referring to this figure, it will be noted that the flapper 12 is at the 100-pound position, while the nozzle 13, end bar 15 and common bar 16 are all at positions numbered 10. When the flow deviates from 100 pounds to 98, and the operating air pressure increases, the reset mechanism M is subject to the increased operating pressure. Due, however, to the capillary coil 29, the increase in operating air pressure is reflected more rapidly in the fast-acting bellows 14 than it is in the slow-acting bellows 17. Consequently, the fast-acting bellows 14 expands rapidly, pushing end bar 15 upwardly to position, say, #12, and common bar 16 downwardly to position, say, #9, as indicated in Figure 3. These movements of the bars 15 and 16 are transmitted to the follower 13 of the air relay R, adjusting the follower to a new position approximating the final position necessary to maintain the higher operating pressure.

As the slow-acting bellows 17 expands, it pushes the common bar 16 upwardly from position 9 in Figure 3, thus effecting, through link 16a, a further adjustment in the position of the follower 13. Since each of these adjustments has some effect upon the air-leakage rate, and since the air leakage rate determines the operating air pressure, each adjustment is necessarily accompanied by a change in the operating pressure, while each change in the operating pressure necessarily has some effect upon the position of the parts of the reset mechanism. Ultimately, and, in fact, fairly rapidly, the bars 15 and 16 will reach positions of equilibrium as, for example, the positions 11 indicated in Figure 4.

Figure 4:
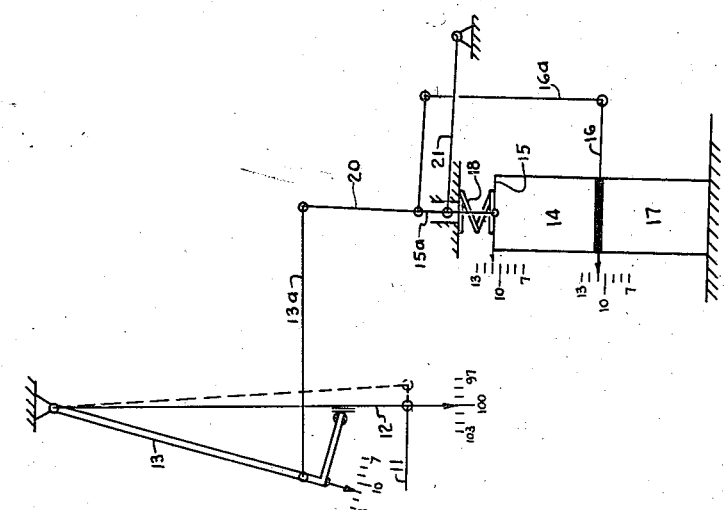
Figures 2, 3 and 4 are schematic views showing the relative positions of various parts of air-leakage relay and reset mechanism respectively before, during and after a resetting operation.

By comparing Figure 2 with Figure 4, it will be noted that bars 15 and 16 in Figure 2 occupied positions #10 for a 100-pound flow, whereas in Figure 4, they occupy positions #11 for the same flow. In other words, the reset mechanism has reset itself from one position for one flow to another position for the same flow, and, in doing so, has reset the nozzle 13 of the air-leakage relay R from one value of air leakage (position #10 in Figure 2) to another value of air leakage (position #11 in Figure 4).

It will be understood that the operation of the various parts of the control mechanism is instituted more or less simultaneously but occurs at the different rates occasioned in part at least, by the capillary coils 24 and 29. It will also be understood that the air leakage relay R will operate, in response to an increase in the weak-liquor flow, to decrease the operating air pressure, and that the reset mechanism M will operate, in response to a decrease in the operating pressure, to reset the air relay R to the smaller value of air leakage necessary to maintain the smaller operating air pressure.

The foregoing control system operates as a straight flow control, that is to say, it operates to maintain the flow at a given value. As previously pointed out, link 21 has heretofore been longitudinally shifted manually to readjust the control system from one control point to another to accommodate changes in an operating condition of the absorption system requiring for correction a new rate of weak-liquor flow. Changes in either the capacity of the absorption system or in its operating ratio are changes of this character. Now it has been assumed that the reset mechanism has been set at a control point corresponding to a 100-pound flow. If changed operating conditions require a larger or smaller flow, then link 21 should be shifted in one direction or another to reset the mechanism to the appropriate control point. In accordance with my invention, this readjustment is occasioned automatically by means of an auxiliary control system P substantially identical to the control system F. The operation of the auxiliary control system P is instituted through a suitable indicator responsive to changes in some condition of pressure or temperature in the absorption system which conditions should be maintained constant. For example, it may be responsive to changes in the refrigerating temperature of one unit or another. Preferably, however, it is made responsive to changes in the gas pressure of the gas line 3. The shift in the link 21 is effected by connecting the terminal pressure line of the auxiliary control system P to a bellows to which link 21 is connected.

Since the auxiliary control P is substantially identical to the control F, it is not described in detail, but its parts are designated by numbers ten times higher than the numbers given to the corresponding parts of control F. It should suffice, therefore, to say that a pressure gauge 80 is used to operate a control arm 100 in response to changes in the gas pressure of line 3. This control arm 100 is connected, through linkage 110, to flapper 120 in the usual way. The terminal pressure line 280 is connected to a pressure responsive bellows 60 which, in turn, is connected directly to the readjusting link 21 of control F. The bell crank 200 may be adjusted to a predetermined position, corresponding to the gas pressure to be maintained constant in line 3, by means of a hand control H which is connected through link 210 to link 150a. The only other difference between the auxiliary controls F and P is that the capillary coil 290 of control P is designed to provide an operating lag in control P similar to the lag in the refrigerant cycle while the corresponding coil 29 of control F is designed to provide this control with an operating lag similar to the lag of the liquor cycle. The lag produced in the operation of control P is sufficient to permit control F to correct unnecessary or undesirable changes of minor character in the flow of weak liquor and thereby substantially restrict the operation of control P to corrections necessitated by changes in the flow of weak liquor occasioned by changes in operating condition.

It will thus be evident that variations in the weak-liquor flow would cause variations in the gas pressure, but, due to the lag in the refrigerant cycle, the corrections in the weak-liquor flow will be occasioned by control F largely before control P can institute and complete a correcting operation. However, when the load of the refrigerating system is changed, or when operating conditions, such as cooling water temperature or available steam pressure changes sufficiently to require a different weak liquor flow for the same gas pressure, the control F will attempt to maintain the same weak-liquor flow for which it is set, but this will result in a change in gas pressure. Accordingly, as the gas pressure begins to rise or fall, the control P will be operated to effect the necessary readjustment of the setting of control F, and thereby increase or decrease the flow of weak liquor to a new value which the new condition requires. If the change be accomplished rapidly, the correction will be accomplished rapidly as a result of the rapid operation of the fast-acting bellows 140. On the other hand, if the change occurs gradually, the correction will occur more or less continuously in a gradual manner because the time interval of the change permits the slow-acting bellows 170 to operate but slightly behind the operation of the fast-acting bellows 140. From this, it should be evident that the control P will automatically readjust the control F to meet changes in operating conditions and thus avoid or substantially restrict undesirable variations in the operation of the refrigerating system as a result of such changes. Furthermore, such readjustment will be effected either rapidly or slowly in response to rapid or slow changes in the operating conditions.

Having described my invention, I claim:

1. In a control system for pneumatically controlling the weak-liquor valve in an absorption refrigerating system of the closed cycle type wherein weak-liquor from a heat exchanger and gas from an evaporator are both fed to an absorber to form a strong liquor, the combination with a "main" control system of the reset type—having: a terminal pressure line charged with an operating air pressure and connected pneumatically to the weak-liquor valve to adjust the latter in response to changes in its operating air pressure; an air leakage relay, responsive to changes in the weak-liquor flow, to change the operating air pressure in order to move the valve and thus restore the flow; a reset mechanism, responsive to changes in the operating air pressure, to reset the air-leakage relay so that when the flow is restored the relay will maintain the air pressure at the changed value; and a connection between the reset mechanism and the air leakage relay which connection is adjustable to different control points corresponding to different weak-liquor flows—of an "auxiliary" control system of the same reset type, responsive to changes in an operating condition of the absorption system requiring for correction a new rate of weak liquor flow, for adjusting the control point connection of the main control system to the new flow rate, the auxiliary control system having: its air leakage relay operating, in response to changes in said operating condition, to change its operating air pressure; its terminal pressure line connected pneumatically to the main control point connection and operating, in response to changes in its operating air pressure, to adjust the main control point connection; and its reset mechanism operating, in response to changes in its operating air pressure, to reset the air leakage relay so that when said other operating condition is corrected, the relay will maintain the operating air pressure at the changed value.

2. The combination defined in claim 1 wherein the air leakage relay of the auxiliary system operates in response to changes in the absorber gas pressure.

3. An automatic control system for pneumatically controlling the weak liquor valve in an absorption refrigerating system of the closed cycle type wherein weak-liquor from a heat exchanger and gas from an evaporator are both fed to an absorber to form a strong liquor comprising: a "main" control system of the reset type—having: a terminal pressure line charged with an operating air pressure and connected pneumatically to the weak-liquor valve to adjust the latter in response to changes in its operating air pressure; an air leakage relay, responsive to changes in the weak-liquor flow, to change the operating air pressure of said line in order to move the valve and thus restore the flow; a reset mechanism, responsive to changes in the operating air pressure to reset the air leakage relay so that when the flow is restored, the relay will maintain the air pressure at the changed value; and a connection between the reset mechanism and the air leakage relay which connection is adjustable to different control points corresponding to different weak-liquor flows; and an "auxiliary" control system of the same reset type—having: a terminal line charged with an operating air pressure and connected pneumatically to the main control point connection to adjust the latter in response to changes in the operating air pressure of the auxiliary system; an air leakage relay, responsive to changes in an operating condition of the absorption system requiring for correction a new rate of weak-liquor flow, to change the auxiliary operating air pressure; and a reset mechanism operating, in response to changes in the auxiliary operating air pressure, to reset the air leakage relay so that when said operating condition is corrected the relay will maintain the operating air pressure to the changed value.

4. The control system defined in claim 3 wherein the air leakage relay of the auxiliary system operates in response to changes in the absorber gas pressure.

FRANCIS P. SHANNON.